US007499882B2

(12) United States Patent
Cole (10) Patent No.: US 7,499,882 B2
(45) Date of Patent: Mar. 3, 2009

(54) METHOD FOR AUTOMATICALLY PROCESSING A FINANCIAL LOAN APPLICATION AND THE SYSTEM THEREOF

(75) Inventor: James A. Cole, Carp (CA)

(73) Assignee: Teranet Enterprises Inc., Toronto, Ontario (CA)

( * ) Notice: Subject to any disclaimer, the term of this patent is extended or adjusted under 35 U.S.C. 154(b) by 1269 days.

(21) Appl. No.: 10/003,368

(22) Filed: Nov. 15, 2001

(65) Prior Publication Data

US 2002/0099650 A1    Jul. 25, 2002

(30) Foreign Application Priority Data

Nov. 15, 2000   (CA) .................................. 2326055

(51) Int. Cl.
*G06Q 40/00*   (2006.01)
(52) U.S. Cl. .............................. 705/37; 705/38; 705/36; 705/35
(58) Field of Classification Search ................ 364/408, 364/400; 701/207; 705/26, 34, 35–38; 342/351
See application file for complete search history.

(56) References Cited

U.S. PATENT DOCUMENTS

| | | | | |
|---|---|---|---|---|
| 4,876,648 | A | * | 10/1989 | Lloyd ........................... 705/38 |
| 5,262,941 | A | | 11/1993 | Saladin et al. |
| 5,361,201 | A | | 11/1994 | Jost et al. |
| 5,414,621 | A | | 5/1995 | Hough |
| 5,611,052 | A | | 3/1997 | Dykstra et al. |
| 5,636,117 | A | | 6/1997 | Rothstein |
| 5,644,726 | A | | 7/1997 | Oppenheimer |
| 5,668,591 | A | * | 9/1997 | Shintani ..................... 725/140 |
| 5,680,305 | A | | 10/1997 | Apgar, IV |
| 5,774,873 | A | * | 6/1998 | Berent et al. .................. 705/26 |
| 5,794,219 | A | * | 8/1998 | Brown ......................... 705/37 |
| 5,857,174 | A | | 1/1999 | Dugan |
| 5,930,775 | A | | 7/1999 | McCauley et al. |
| 5,930,776 | A | | 7/1999 | Dykstra et al. |
| 5,960,407 | A | | 9/1999 | Vivona |

(Continued)

FOREIGN PATENT DOCUMENTS

| | | |
|---|---|---|
| CA | 2293174 | 12/1999 |
| CA | 2362447 | 7/2001 |
| WO | 00/65508 | 11/2000 |

OTHER PUBLICATIONS

Fairfield takes control of small-business loan fund; [DOWNEAST Edition] Mike Laberge Of the NEWS Staff. Bangor Daily News. Bangor, Me.: Jul. 26, 2000. p. 1.*

*Primary Examiner*—Frantzy Poinvil
*Assistant Examiner*—Clement Graham
(74) *Attorney, Agent, or Firm*—Pearne & Gordon LLP (57) ABSTRACT

A method for automatically processing a loan application where a real property is used as collateral is disclosed. The method comprises steps of (a) inputting the loan application into a computer system, (b) providing the address of a collateral property to an automated valuation model (AVM) system, (c) receiving valuation data for the corresponding property from the AVM system; (d) determining a maximum allowable loan (LoanCap) by applying a pre-set lending policy to the valuation data and information provided in the loan application, and (e) comparing a requested loan amount in the loan application to the LoanCap, so that, when the requested loan amount is within the LoanCap, the loan application can be approved, wherein the steps (b) to (e) are automatically carried out in the computer system. The computer system for automatically processing the loan application is also disclosed.

21 Claims, 7 Drawing Sheets

U.S. PATENT DOCUMENTS

| | | |
|---|---|---|
| 5,966,700 A | 10/1999 | Gould et al. |
| 5,983,206 A | 11/1999 | Oppenheimer |
| 5,991,745 A | 11/1999 | Kiritz |
| 5,995,947 A | 11/1999 | Fraser et al. |
| 6,012,047 A | 1/2000 | Mazonas et al. |
| 6,029,149 A | 2/2000 | Dykstra et al. |
| 6,058,369 A | 5/2000 | Rothstein |
| 6,067,533 A | 5/2000 | McCauley et al. |
| 6,088,686 A | 7/2000 | Walker et al. |
| 6,105,007 A | 8/2000 | Norris |
| 6,112,190 A | 8/2000 | Fletcher et al. |
| 6,115,694 A * | 9/2000 | Cheetham et al. ............. 705/10 |
| 6,141,648 A | 10/2000 | Bonissone et al. |
| 6,871,140 B1 * | 3/2005 | Florance et al. ............. 701/207 |

\* cited by examiner

METHOD FOR AUTOMATICALLY PROCESSING A FINANCIAL LOAN APPLICATION AND THE SYSTEM THEREOF

FIELD OF THE INVENTION

The invention relates generally to financial lending processes and more particularly to automated decision-making in financial lending processes, where real properties are used as collateral.

BACKGROUND OF THE INVENTION

Prudent lending practice where residential properties are used as collateral demands that the market value of residential properties be validated by some means. Lending bodies have traditionally depended on appraisals to guide them in their lending decisions, and appraisals will always be a valuable tool.

In most loan applications where residential properties are used as collateral, there is sufficient equity in the property to justify the loan. The degree of due diligence necessary regarding the property depends on the value of the property, and the amount of loan requested. Traditional full appraisals are not necessary in every instance; however, prudent lending practice demands that some objective, independent, controllable risk assessment of each case be done.

Automated Valuations Models (AVM's) are available, which calculate current market values for residential properties based on large databases of property and sales data. AVMs offer several distinct advantages including: the ability to produce valuation instantly, and produce other information about the property and background market that would be difficult or impossible to produce manually. They have the potential to be a very effective tool for lending institutions. However, there has not been a general process to embed them in the lending process.

The very nature of AVM's is such that they are in some ways not as precise nor as specific as traditional methods. Since the use of an AVM directly affects lending decisions, it is essential that any such process be controllable through the risk management function of the lending institution.

Therefore, there exists a need for a systematic way to implement the safe use of modern AVM's into the lending decision, in a controlled and customized manner.

SUMMARY OF THE INVENTION

According to one aspect of the present invention, there is provided a method for processing a loan application by virtue of a computer system, where a real property is presented as collateral by the loan applicant. The method comprises steps of: (a) inputting the loan application into the computer system, the loan application containing the address of the real property, (b) providing the address of the property to an automated valuation model (AVM) system, the AVM system being capable of producing and returning valuation data for a real property in response to the provision of the address thereof, (c) receiving valuation data for the corresponding property from the AVM system, (d) determining a LoanCap for the corresponding property by applying a predetermined lending policy to the valuation data and information provided in the loan application, the lending policy having been pre-set in the computer system, and (e) comparing a requested loan amount in the loan application to the LoanCap, wherein, when the requested loan amount is within the LoanCap, the loan application can be approved, and (f) wherein, after the step (a), the steps (b) to (e) are carried out automatically in the computer system.

According to another aspect of the present invention, there is provided a method for processing a loan application where a real estate property is presented as collateral by the loan applicant. The method comprises steps of: (a) checking whether or not all required credit and lending criteria, except for valuation of the property, are satisfied, wherein, if satisfied, the following step (b) is carried out, and if not satisfied, the loan application is denied or returned to the applicant thereof, (b) carrying out the method as previously described.

According to another aspect of the present invention, there is provided a computer system for processing a loan application, where a real property is presented as collateral by the loan applicant. The system comprises: (a) means for inputting the loan application into the system, the loan application containing the address of the real property, (b) means for providing the address of the property to an automated valuation model (AVM) system, the AVM system being capable of producing and returning valuation data for a real property in response to the provision of the address thereof, (c) means for receiving valuation data for the corresponding property from the AVM system, (d) means for determining a LoanCap for the corresponding property by applying a pre-determined lending policy to the valuation data and information provided in the loan application, the lending policy having been pre-set in the system, and (e) means for comparing a requested loan amount in the loan application to the LoanCap, wherein, when the requested loan amount is within the LoanCap, the loan application can be approved.

Other aspects and advantages of the invention will become apparent to those ordinarily skilled in the art upon review of the following description of the invention in conjunction with the accompanying drawings.

BRIEF DESCRIPTION OF THE DRAWINGS

Embodiments of the invention will be described with reference to the accompanying drawings, wherein.

DETAILED DESCRIPTION OF THE PREFERRED EMBODIMENT(S)

The present invention relates to a method and system for supporting residential mortgage lending decisions using modern AVM's (Automated Valuations Models) The invention is designed to apply specific prudential guidelines to a data service provided by AVM's, and then produce fast value estimates and prudent lending decisions for real properties, especially residential properties, which are presented as collateral by the mortgage applicant. For the convenience of the description and understanding of the invention, any financial loan application, which the invention can apply to is hereinafter generally referred to as a "loan application", and the collateral residential properties as a "real property," a "collateral real property," or a "property." Also, the borrowing entity is generally referred to as a "borrower," and the lending institution as a "lender."

Figure 1:
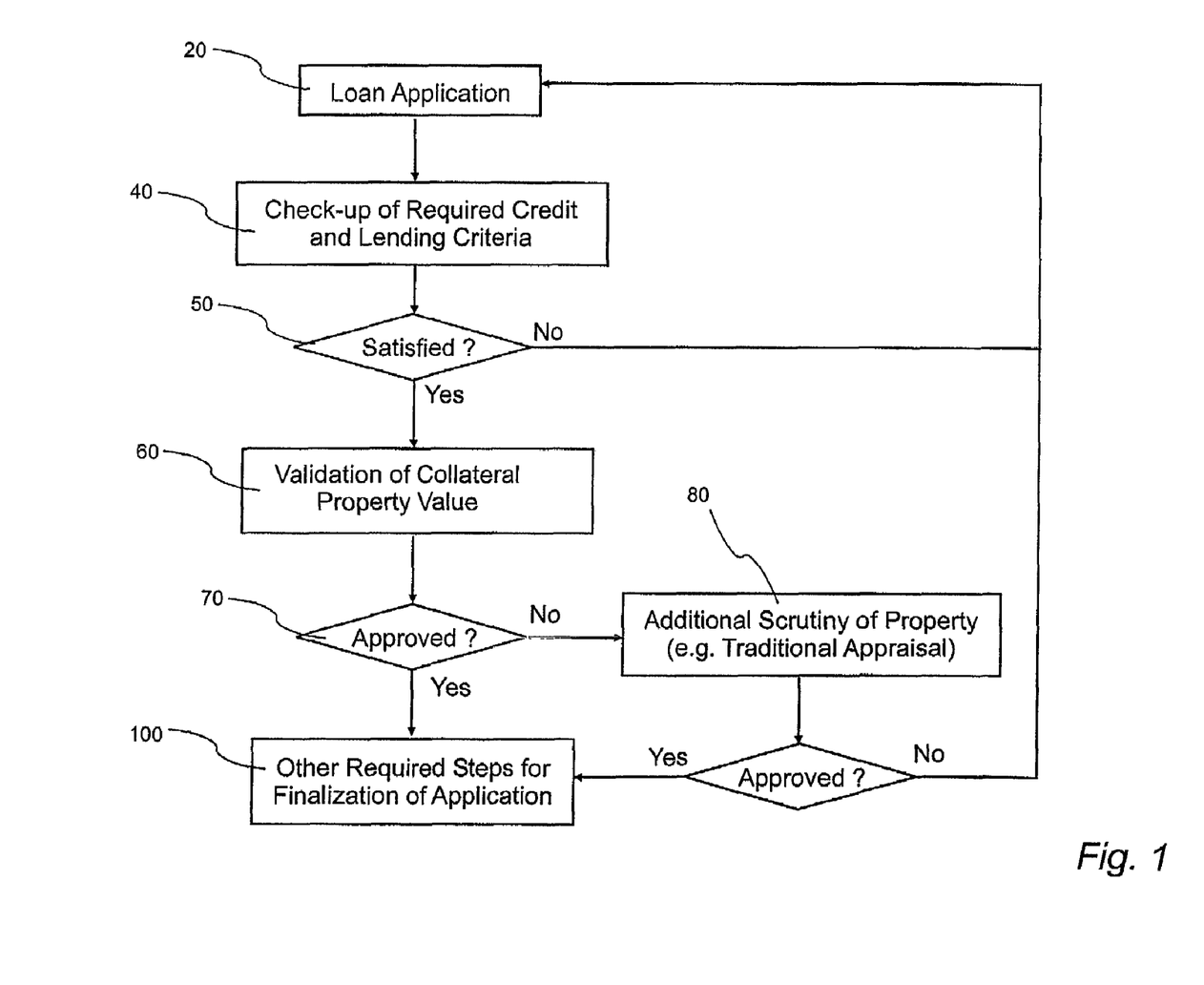
FIG. 1 illustrates a basic processing of financial loan applications where a collateral property is involved and the present invention is applied.

In FIG. 1, there is generally shown a basic processing for a loan application, where the method and system of the invention can be applied. As illustrated in FIG. 1, in general, the loan application 20 goes through a check of all required credit and lending criteria as in the step 40. Once the lender is satisfied with the credit worthiness of the borrower, then the validation and valuation process for the collateral real property is carried out as in the step 60. If the result of the validation and valuation is reasonable, as compared to a requested loan amount of the application, the application can be approved and then other required steps for finalizing the application may be applied as in the step 100. Even if the resultant valuation of the collateral property is unfavorable, an additional scrutiny of the property may be processed, for example by using a traditional appraisal as shown in the step 80 of FIG. 1. Likewise, if the result of scrutiny is satisfactory, the application can be approved.

The method and system of the invention is particularly focused on the validation and valuation step 60 of the collateral real property. That is, the method and system act as a front end filter in order to determine whether a particular loan application can be approved immediately through the use of an AVM system, when all other credit checks and lending criteria have been satisfied, and the only remaining check is against the collateral property.

Before going to the specifics of the method and system of the invention, the AVM system will be detailed below:

The term AVM ("Automated Valuation Model") system applies in general to a broad class of computer systems that can produce valuations of the current market value of real properties, including residential properties. These AVM systems are quite complex in their own right, and typically involve large databases of property and sales related information.

There will always be some amount of uncertainty in any AVM valuation, which is inherent in any mathematical prediction about a matter that is inherently variable in many cases. Traditionally, accuracy derived from statistical inference can be measured based on many cases, and AVM performance based on many valuations over a portfolio of actual property values can be measured very accurately. However, there are usually statistical anomalies, sometimes referred to as "outlyers" in any such portfolio.

However as precise as any AVM system is, as measured over a portfolio, any single valuation of a specific property can be inaccurate, for good reason. These include errors in underlying data, lack of relevant comparable data, data which is not current, the relevant valuation method is not applicable, and/or to special conditions (most notably current property condition), which are not covered in the data. The invention is intended to facilitate the use of AVM system in a safe and sound manner in the lending process, and to mitigate against these inherent difficulties.

A real risk of using any AVM is that it cannot be guaranteed that any value that it comes up with for a specific collateral real property is accurate. Virtually in any market, there will be some level of error that must be accepted as an inherent part of any automated valuation, and sometimes errors can be large.

In addition to a single value for a specific real property, most AVM's produce additional measures of other attributes of the real property and surrounding neighborhood, many of which can be relevant to a lending decision on the property.

As noted above, the method and system of the invention act as a front end, or filter, in the lending process, once all other credit checks and lending criteria have been satisfied, and the only remaining check is against the property.

Figure 2:
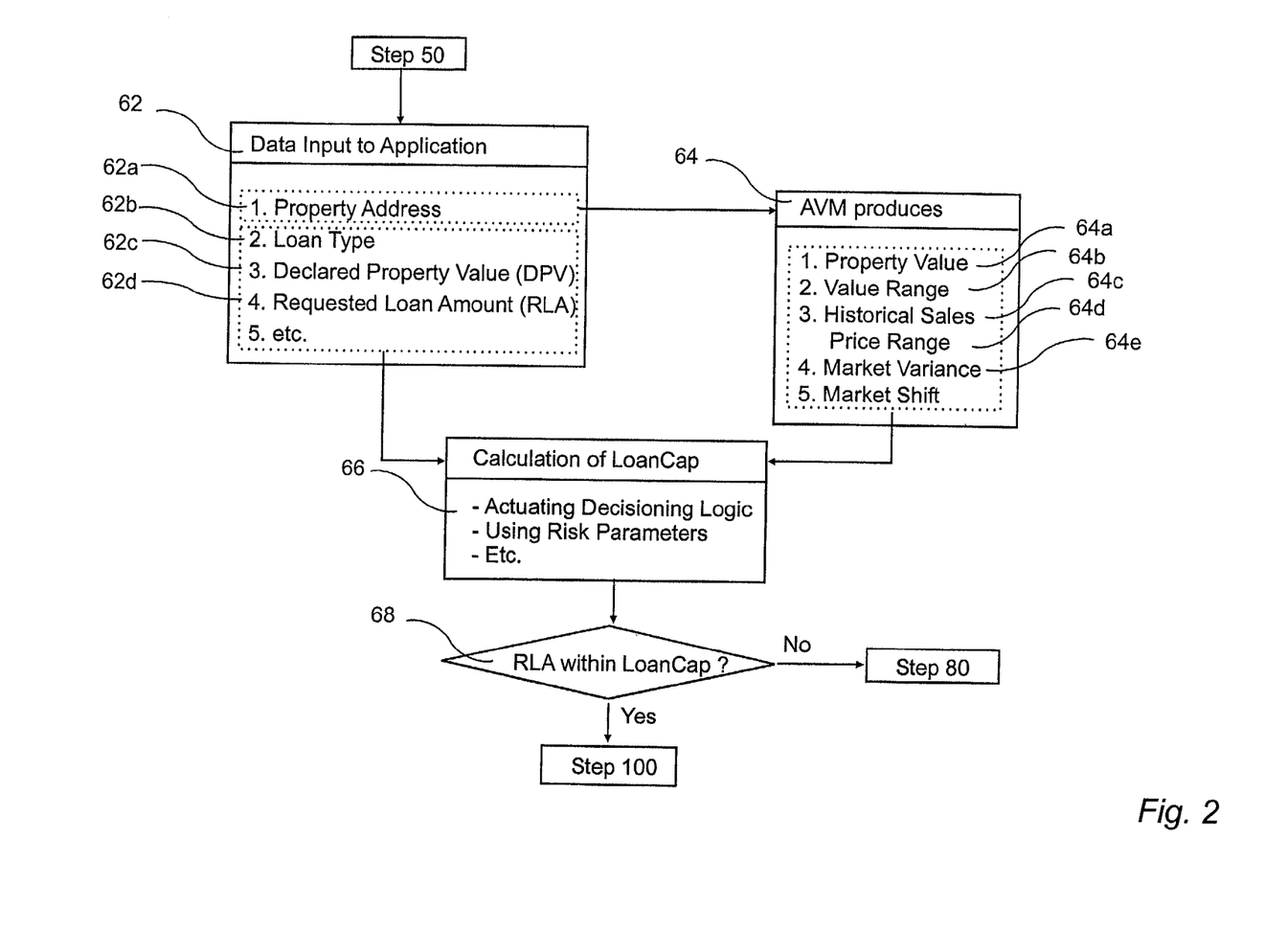
FIG. 2 illustrates a schematic process for the validation of the collateral property in FIG. 1 according to one embodiment of the present invention.

FIG. 2 illustrates a schematic process for the validation of the collateral property according to one embodiment of the present invention. As shown in FIG. 2, the method generally comprises steps of: 1. inputting the loan application into the computer system of the invention (step 62), 2. providing the address of the collateral property to the AVM system, 3. receiving calculated valuation and other relevant information for that property, 4. determining a LoanCap (which will be detailed hereafter) by using the valuation and related information (step 66), and 5. approving the loan application if the requested loan amount is within the LoanCap (step 68).

Figure 3:
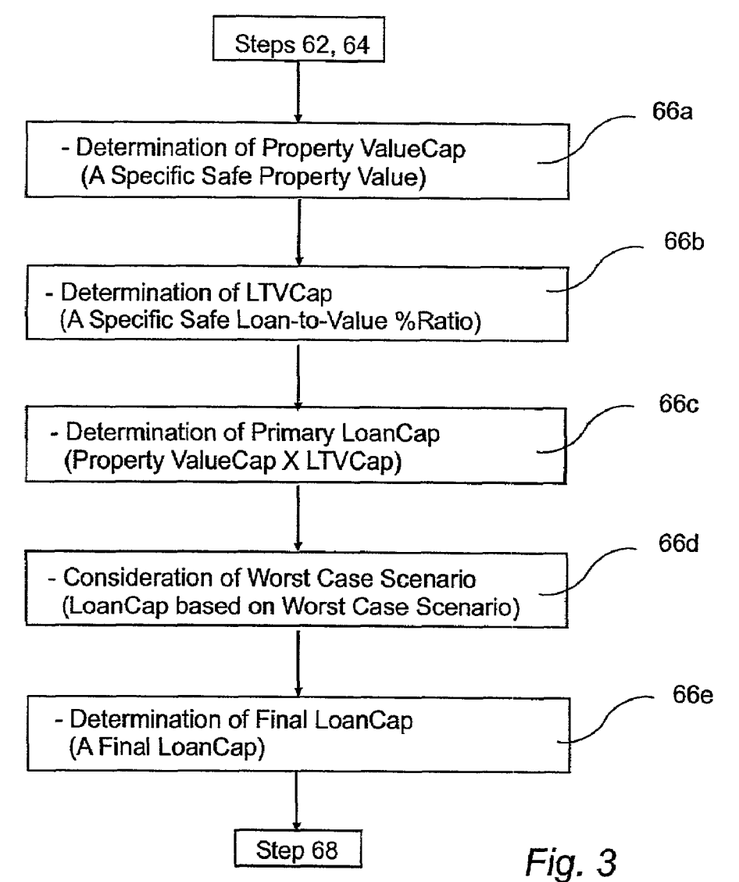
FIG. 3 illustrates a schematic process for the calculation of LoanCap in FIG. 2 according to one embodiment of the present invention.
Figure 3A:
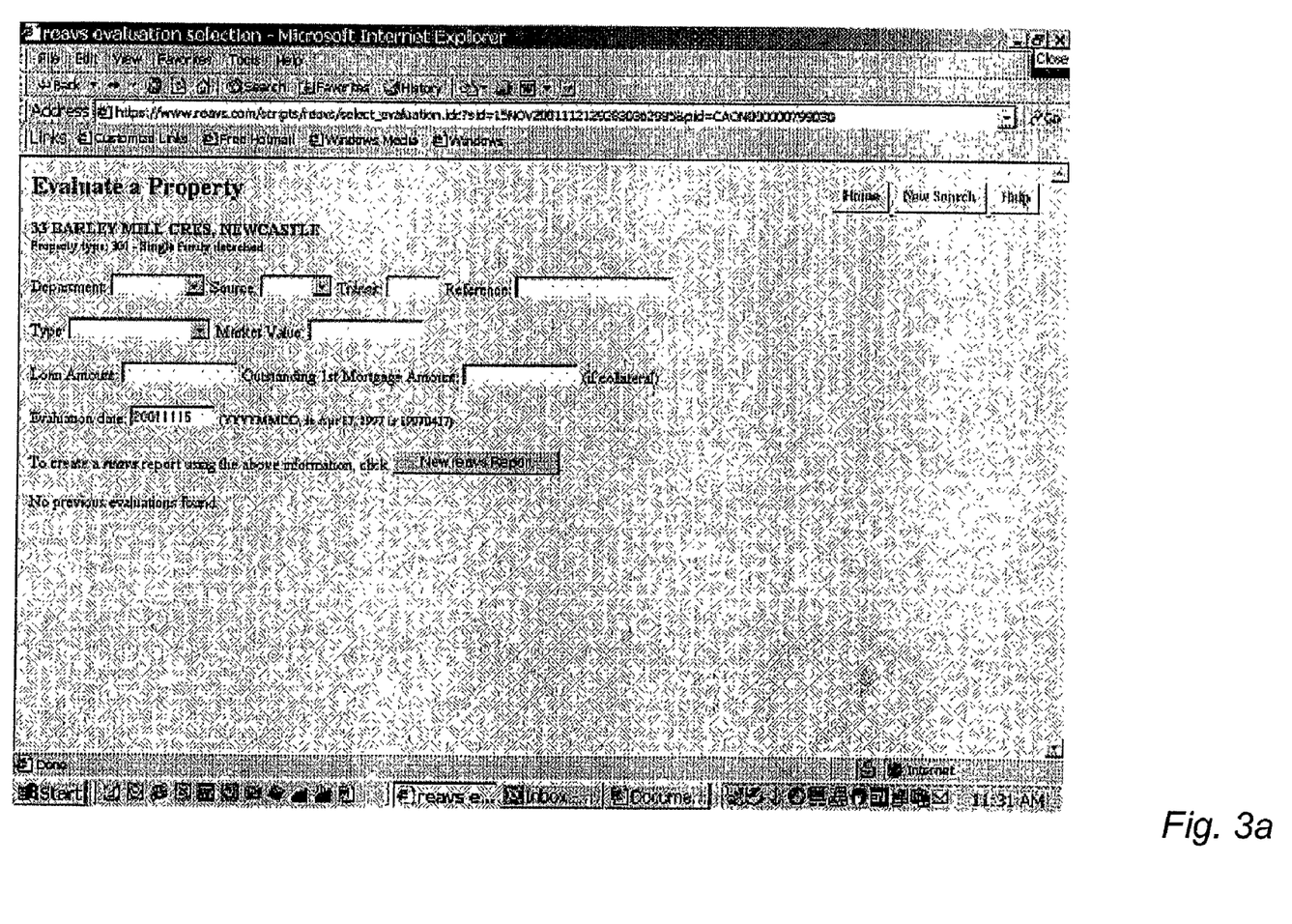
FIG. 3a illustrates an example of application input screen of the system.

Referring to FIG. 2, each step of this embodiment will be detailed below:

For every transaction, firstly the loan application is input to the system where the necessary data fields are filled with information provided in the application as shown in the step 62 of FIG. 2 and in FIG. 3a. The information includes the address of the collateral real property 62a, the loan type 62b (for example, purchase, transfer, refinance, collateral, or the like), a declared property value or a purchase price of the property 62c, a requested loan amount 62d. Additionally, several other pieces of data can be entered, such as the lender identification, the department since separate decisioning rules can be set up for different departments within the same organization if desired. The term "department" should be taken in a broad sense to mean any separate part of the whole lending organization. Also, a transit number, internal reference number, and source can be input, but these are not required for the internal decisioning.

Then, the system automatically provides the address of the collateral property to the AVM system. As noted above, the AVM system is adapted to produce and return valuation data for the collateral property in response to the provision of the address of the corresponding property as depicted in the step 64 of FIG. 2. The valuation data includes the following:

1. A Core Property Value 64a: A single best estimate of value at the point in time, which will be hereafter referred to as a "Property Value,";

2. A range of value for the particular property 64b: This range of value can be considered as the "reasonable" range for a specific property and will be hereafter referred to as a "Value Range,";

3. A range of value for properties in close proximity 64c: This simply reports the historical range of sales prices in the area, from the very high to the very low, and will be hereafter referred to as "Historical Sales Price Range";

4. A measure of Market Variance 64*d*: This is a measure of the variability of the underlying data, can be considered as a guide to how accurate the value is expected to be, and will be hereafter referred to as a "Market Variance,"; and 5. A measure of Market Shift 64*e*: This reports the change in the overall market, for example, over the last year, measured as a percentage change. Which will be hereafter referred to as a "Market Shift."

In another embodiment, the address of the collateral property can be provided to a plurality of AVM systems, each of which provides independent valuation data for the same property, thereby enhancing the reliability of the data.

Figure 4:
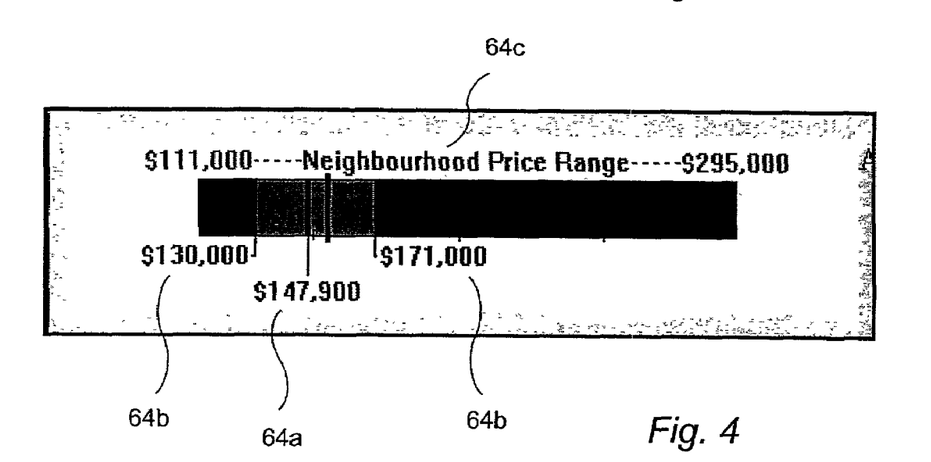
FIG. 4 shows part of the system of the invention displaying an example of valuation date from an AVM system according to the present invention.
Figure 4A:
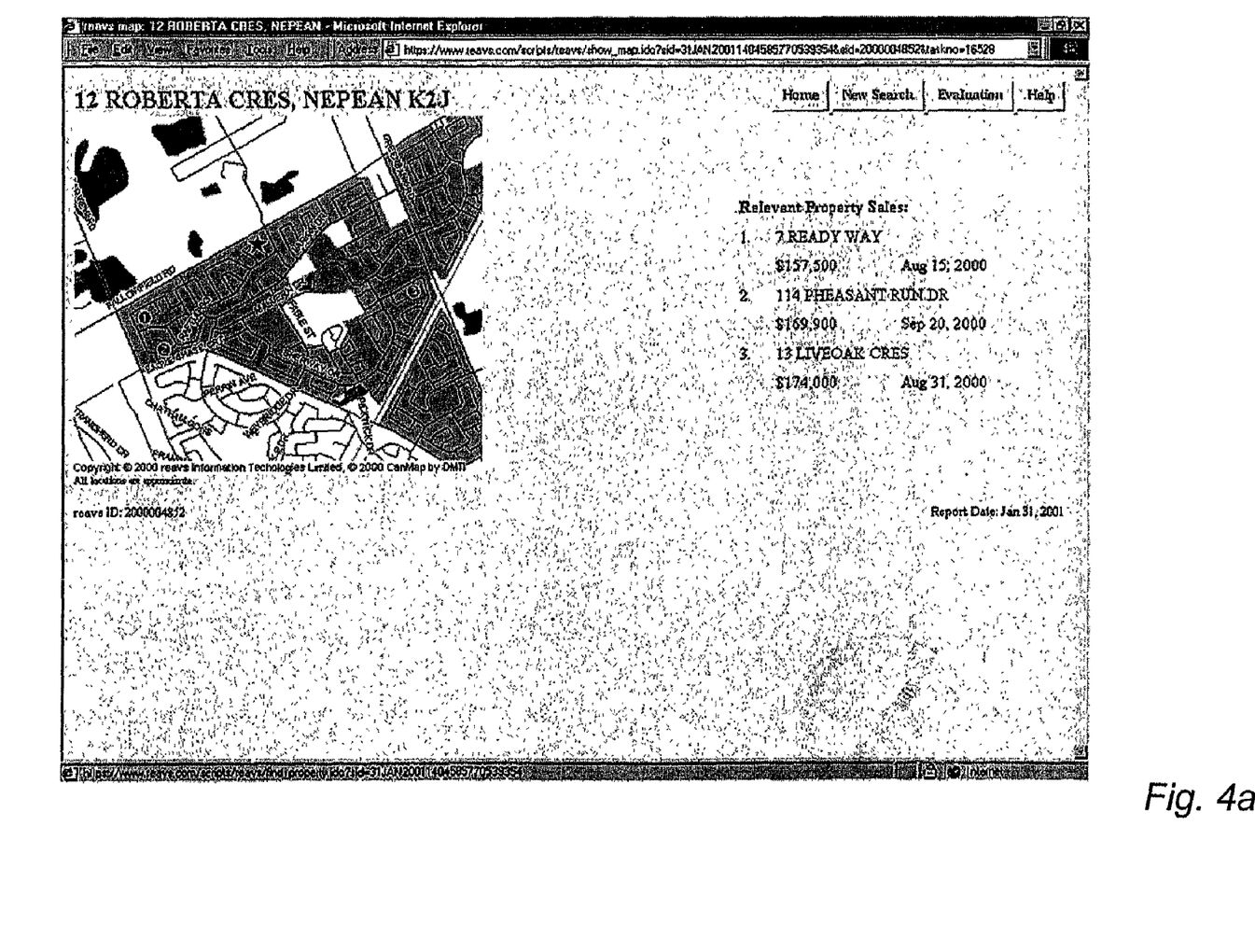
FIG. 4a shows part of the system of the invention displaying a map of the neighborhood with relevant property sales information included.
Figure 6:
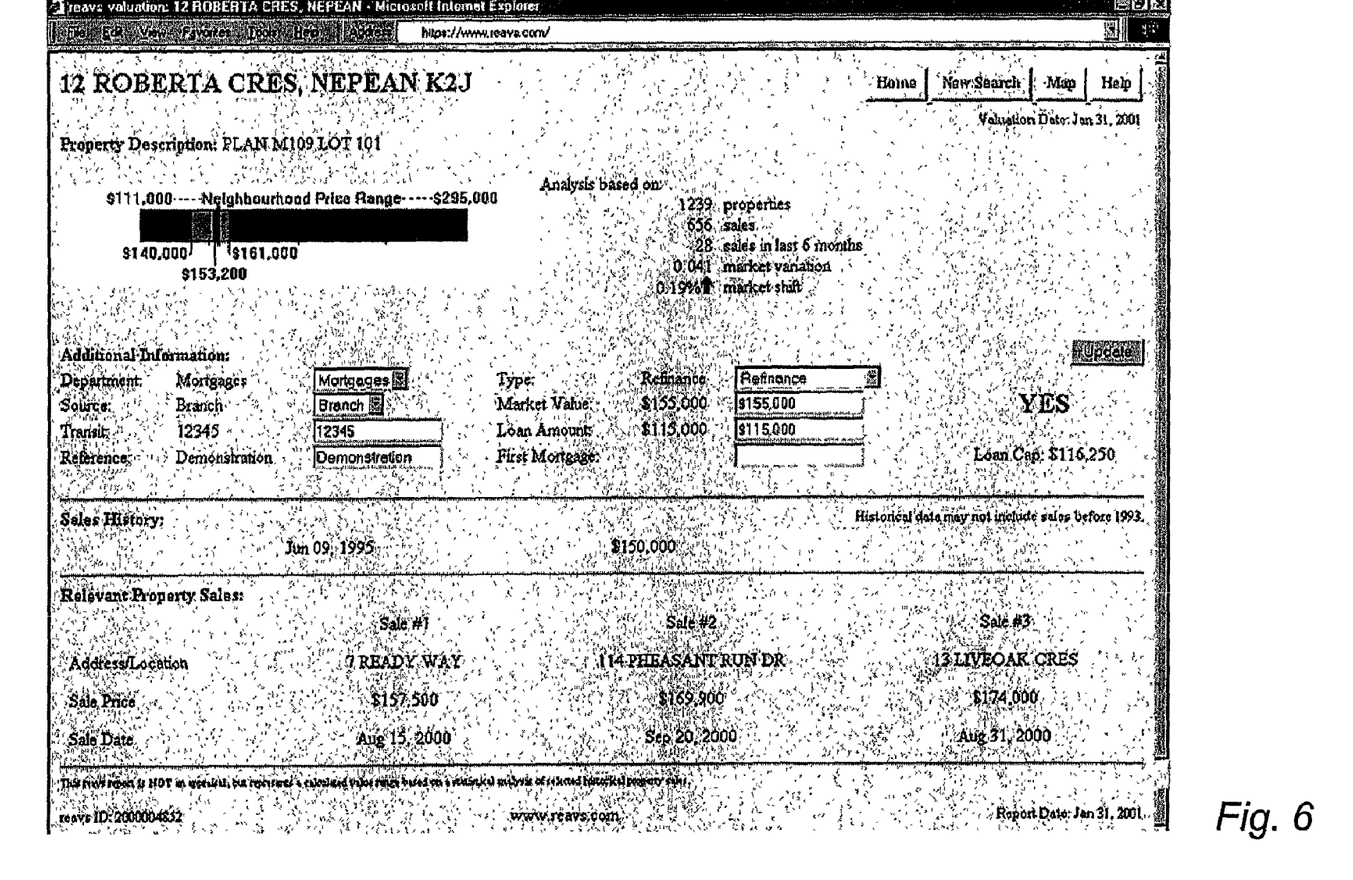
FIG. 6 shows part of the system of the invention displaying and a resultant report of loan processing according to the present invention.

FIGS. 4, 4*a* and 6 show an example of the valuation data displayed in the system of the invention according to one embodiment thereof.

If the above valuation data independently supplied by the AVM system and the declared property value by the applicant are reasonably close, there is little need to further substantiate the declared property value. The two values essentially substantiate each other. If there is a great difference between them, there can be less certainty of the property value.

In addition to substantiating the property value, the method also provides control over the amount of the loan, which can be made relative to the property value.

In the next step 66 of FIG. 2, therefore, a LoanCap is determined for the corresponding collateral property by applying a set of pre-set parameters to the valuation data and information provided by the AVM system and the loan application respectively. The pre-set parameters present and reflect predetermined lending policies of the lender, for example approved by the risk management. The "LoanCap" means the maximum loan amount that can be approved for a specific collateral presented by a loan applicant or a borrower.

Then, as shown in the step 68 of FIG. 2 and the system of FIG. 6, if the requested loan amount is within the loan cap, the loan application is approved, as for example a simple Yes or No response. if the requested loan amount is higher than the LoanCap, it does not necessarily mean that the loan application is denied. As noted above, it simply means that it is not safe enough to be approved through the AVM alone, and that other scrutiny of the property, such as a traditional appraisal, can be carried out.

The determination of the LoanCap takes into account the various values, scores and market data that the AVM system supplies relating to a specific collateral property, and merges them with the information provided by the loan application. While the underlying logic is complicated, the result (the LoanCap) is very specific.

The determination logic method internally compares the valuation data returned by the AVM system against the declared property value provided as part of the loan application. Such a declared property value is always part of any loan application where a residential or real property is used as collateral. In no way, the declared property value can be used by the AVM system.

The LoanCap presents the maximum loan amount that can be approved immediately through the use of the method and system of the invention. The LoanCap is a very useful, general-purpose dollar value that can be easily controlled and adjusted by risk management for different purposes, and yet is easy to use within the day-to-day lending process.

The process and logics for determining the LoanCap will be described in greater detail, referring to FIG. 3, which shows a schematic process for the calculation of LoanCap according to one embodiment of the present invention.

As shown in FIG. 3, the LoanCap calculation logic is broken done into the following components:

1. Determination of a Property Value Cap (step 66*a*): What is a safe property value to use? Is the declared property value supplied reasonable? If not, what is the highest value that can be substantiated? Therefore, to answer these questions, a specific safe property value is determined, which is referred to as a "Property Value Cap."

2. Determination of a Loan to Value % Cap (LTVCap) (step 66*b*): What LTV ratio is safe? In conventional lending, a loan can be made up to 75% LTV ratio of the property value. Is it necessary to lower this LTV ratio to mitigate against some risk? Therefore, a specific safe LTV ratio is determined, which is referred to as a "LTVCap."

3. Determination of a Primary LoanCap (step 66*c*): The primary LoanCap is the product of the Property ValueCap and the LTVCap.

4. Determination of a Worst-case LoanCap based on a worst case scenario (step 66*d*): Consideration of a worst case scenario. In the unlikely event of default on this property, is there sufficient equity to safely cover the loan amount and associated realization costs? Therefore, a worst-case LoanCap is determined.

5. Determination of a final LoanCap (step 66*e*).

Here, the term "cap" is used to describe any upper limit set.

The LoanCap value, which is the end result of the calculation is intended as a precise limit to the amount of risk that is acceptable for the collateral property associated with a particular loan application. For the purpose of the description of the detailed LoanCap calculations, the following example case of loan application is assumed.

A Example Case of Loan Application and Valuation Data:

This example case will be referenced whenever required for the description of the invention.

Let it be assumed that a refinance of a mortgage has been applied on the real property at "233 Anywhere Street." The applicant has applied for $125,000 and has indicated that she feels the property is worth $167,000, resulting in a loan at face value with an LTV% of ($125,000/167,000) or 74.8%. That is, the requested loan amount is $125,000 and the declared property value is $167,000.

The AVM has returned its valuation data as shown in FIG. 4, where the property value presents $147,000, and the value range is from a low limit of $130,000 to a high limit of $171,000. This property is located in a neighborhood where historical sales prices range indicates a overall value range of $111,000 to $295,000.

Further, the AVM indicates a market variance of 0.13, and a market shift of 2.3%.

There are many other parameters, which come into play as part of this implementation, but these will be dealt with through the following discussion.

Finally, let it be assumed that the lender has already done due diligence on the borrower, and is assured that the borrowers' credit history is satisfactory, and can adequately service the loan. The only remaining step is to validate the collateral property value.

Consideration of Valuation Data provided by AVM system

1. Property Value: The AVM provides an instant specific current estimate of value for any single property. The nature of any estimate (automated or otherwise) is such that this value cannot be guaranteed to be 100% precise. A reasonable high and low value for any single property is more important in actual use.

The valuation data of FIG. 4 shows the core property value 64*a* (in this case $147,900) and how this property fits into its immediate neighborhood. It also shows a reasonable high and low value limit 64b for this specific property.

The "reasonableness" of these value limits should be tailored for each lender, and lending situation. They will reflect the underlying consistency of the market that each property is in, at the time of the valuation. Some markets are very consistent and the actual difference between the high and low ranges may be small. Other markets have significant price fluctuations, and this will be reflected in much larger value ranges.

2. High Value Limit (assuming 80th Percentile): The high value limit is intended to represent an 80% level—i.e. 80% of all open market prices will be below it, and it can be fine-tuned to ensure that this level is achieved. The Low Limit is similarly set, and it can be tuned independently of the High Limit. The AVM system can produce these value limits specifically. These high and low value limits can be set, validated and maintained based on portfolios based open market data (the standard), or (more typically) on data specific to the institution. The details of how these limits are calculated are AVM-dependent.

The High Value Limit, once established, can be thought of as the highest reasonable value that will be allowed for each property in a collateral sense. It does not mean that any property that sells on the market place for more than this high limit is not worth it—there will most certainly be properties that do (in fact, 20% of all market sales). However, if a specific loan demands that there be more equity then the high limit value, additional scrutiny (most likely in the form of a traditional appraisal) is warranted.

The actual percentile used (here 80) should be considered a parameter for risk management approval.

3. Low Value Limit (80th Percentile): The Low Value Limit, once established, can be considered as the worst case, i.e. this property can be reasonably considered to be worth at least this value in this market. This value becomes important in considering a worst case scenario.

Again, the actual percentile included should be considered a parameter for risk. In practice, both high and low desired levels will tend to be the same.

4. Effects of Market Shift an Property Value: The AVM system reports a market shift percentage. The High and Low Value Limits also reflect this market shift. In cases of high market shifts, both positive and negative, the value limits will be lowered, consistent with the actual amount of shift. This acts as a buffer against loaning against property values that have risen dramatically.

Referring to the example loan application, and the valuation data and the consideration therefor, each step of the LoanCap calculation process and logic will be described in greater detail.

Step 66a: Determination of the Property ValueCap

The Property Value Cap that is used for the loan decisioning is determined as the least value among: the declared property value provided by the applicant (in the example case, $167,000), the High Value Limit provided by the AVM system (in the example case, $171,000), or an arbitrary value, based on the area (in the example case, let it be assumed as $400,000).

The lender can set the arbitrary value to the system, as part of its risk management control.

In the example case, therefore, the Property ValueCap is $167,000.

Step 66b: Determination of Loan to Value % Cap (LTVCap)

The loan-to-value percentage (LTV%) for any loan application is fundamental to reaching any lending decision, and risk management has traditionally used LTV% limits as policy to control exposure to risk. The method of the invention uses a variation of this same technique to derive an approval answer in each case.

Depending on the lenders and the loan applications, there is a maximum allowable LTV% for each transaction, as controlled by risk. For example, the LTV ratio for refinances could be restricted to be no more than 75%. However, specifically for a certain geographic area, this requirement may be tightened to cap the LTV to only 65%.

The AVM valuation identifies several conditions that may result in increased risk. To mitigate against each of these, the method of the invention may lower the allowable LTV percentage to a safe level which has been approved by risk. The final LTVCap is the highest ratio that satisfies all of the separate criteria set by the lender to deal with each of the following conditions: 1. An arbitrary limit (i.e. 75%), 2. The transaction type: i.e. purchase, transfer, collateral, 3. The geographic area, 4. Neighborhood real estate market activity, for example, over last 6 months, 5. Neighborhood Historical High sale price, 6. A market variance provided by the AVM system, and 7. a range between the property value provide by the AVM system and the declared property value by the applicant.

1. Arbitrary Limit: Depending on the lender and the loan application, there is a maximum allowable LTV ratio for each transaction. For example, in Canada, conventional lending with no mortgage insurance, the LTV ratio can be no more than 75%.

2. Transaction Type: An LTVCap is typically set depending on the transactions type. At the very least, there are conditions dependent on purchase and non-purchase transactions, but transactions have been split up between Purchase, Refinances, Transfers, and Collateral ($2^{nd}$ mortgages)

3. Geographic Area: LTVCaps may be defined based on regions, where any region is a set of defined municipalities.

4. Neighborhood real estate market activity: The AVM system is constantly updated with all registered sales. Good valuations demand relevant recent sales. A recent sale is defined as one that is consistent in the neighborhood, and which has occurred within, for example, 6 months of the effective date of the transaction. The AVM system produces valuation as long as there are sufficient sales on record; however, there can be less certainty about any current valuation if there are relatively few recent sales. The allowable LTV can be reduced if the number of recent sales falls below a set threshold:

If the ratio of recent sales to the number of properties is less than 2%, the LTVCap is 65%.

5. Neighborhood Historical High sales price: The AVM system reports the highest actual sale of file for similar properties in the same neighborhood. In general, if a property value is close to or more than the neighborhood historical high, further scrutiny is desirable. LTV caps can be set based on how any property value compares to the neighborhood high value. As an example:

If the property value is less than 101% of the neighborhood high, the LTVCap is 75%.

If the property value is between 102 and 105% of the neighborhood high, the LTVCap is 70%.

If the property value is between 105 and 110% of the neighborhood high, the LTVCap is 65%.

The above setting would mean that no application will be immediately approved if the property value is greater than 110% of the historical high in the neighborhood.

6. A market variance provided by the AVM system; The AVM system produces a market variance for each valuation—a score which is a proven indicator of the consistency of the underlying market data. As such, it is an excellent indicator of how good any result can be expected to be. The lower the market variance, the better. The LTVCap is reduced based on the market variance, in three separate thresholds:

If the market variance is less than 0.20, the LTVCap is 75%.

If the market variance is between 0.02 and 0.30, the LTVCap is 70%.

If the market variance is between 0.03 and 0.40, the LTVCap is 65%.

7. A difference between the property value provide by the AVM system and the declared property value by the applicant: The AVM system derives a core property value in each valuation, which represents the single best estimate of the value of each property. The range is the percentage difference between this property value and the declared property value as supplied in the application details. If this range is small, there is little doubt in the declared property value as supplied. As this range increases, there is increasing doubt that the property value as supplied is reasonable. As the range increases, the allowable LTV% of any loan against the property can be decreased based on the parameters provided in this method, to be set by risk management.

Figure 5:
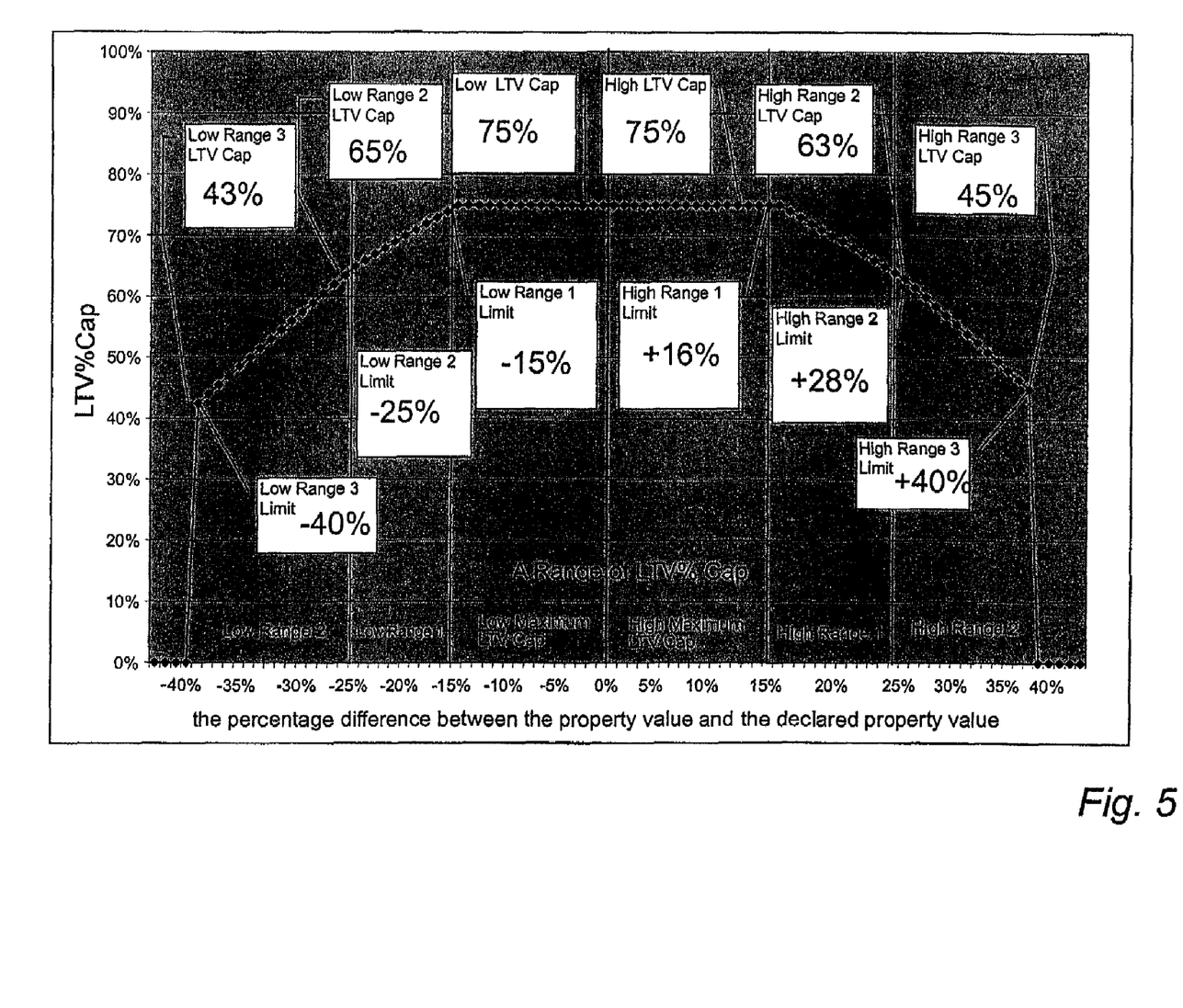
FIG. 5 is a diagrammatic presentation how the LTVCap varies depending on the difference between the property value provided by the AVM system and the declared property value provided by the loan applicant.

FIG. 5 shows how the allowable LTV% in any loan situation can be reduced as the range increases, These can be set differently based on whether the declared property value higher or lower than the AVM's calculated value. The middle vertical line on the chart represents the range of 0%—that is, there is no difference between the declared property value and the property value from the AVM system. The parameters to the right of the vertical line, which are labeled as "High . . . ", represent the situation where the declared property value is higher than the AVM's property value.

Each of the high and low ranges is further split into three smaller, in which the LTVCap will be capped based on the parameters set by the lender.

A. High LTV Cap: This is the highest LTV allowed through the use of the AVM, if the declared property value is higher than the AVM property value. It's generally set at 75%, as in the example.

B. High Range 1 Limit: This is the upper limit to range 1, which allows the High LTV Cap. In the example, this is set to +16%, and means that if the declared property value is above the AVM property value, but within 16% of the AVM value, then loans of up to 75% LTV can be approved C. High Range 2 LTV Cap and High Range 2 Limit: These two parameters, taken together, are used to reduce the allowable LTV based on the range over the High Range 1 Limit. At the specified range, the LTV may be set to the LTV limit. Between the Range 1 and Range 2 limits, the allowable LTV will be reduced proportionally until, as shown, it reaches the set LTV limit.

Looking at the example of FIG. 5, the High Range 1 Limit is 28%, and High Range is 63%. As the range increases over 16% the allowable LTV will be decreased proportionately, until at a 28% range, it will be 63%.

D. High Range 3 LIV Cap and High Range 3 Limit: These two parameters work together exactly as the two Range 2 parameters, with the exception that they take effect above the High Range 2 Limit. Based on the example, for any range more than 28%, the LIV will be reduced proportionately, so that at a range of 40%, an LTV of 45% will be allowed.

E. Low LITV Cap, Low Range 1 Limit: These two parameters work exactly as described for the High LTV Cap and Range Limit, except they come into play when the Declared Property Value is lower than the AVM property value. In the example, the Low LTV Cap of 75% will be allowed if the property value is lower so than the reavs value, up to a range of –15%.

F. Low Range 2 LTV Cap, Low Range 2 Limit, Low Range 3 LTV Cap, Low Range 3 Limit: These four parameters work exactly as previously described for the high ranges, except that they come into play if the declared property value is lower than the AVM property value.

These ranges are intended to allow risk management to control the use of the AVM by lowering the allowable LTV's in a controlled manner as the range between the AVM property values and the declared property values may increase. If the AVM predicts a real market value within a reasonable range, then it substantiates that market value. If that range is higher, there is more doubt, thus the allowable LTV is reduced to a comfortable level.

For both High and Low, the Range 2 is intended to slowly reduce allowable LTV, and Range 3 more so.

8. Determination of the Final LTVCap: The final LTVCap is the lowest of all the LTV% determined through any of the above rules. Note that any rule can take precedence. Also note that this LTVCap can be zero, which will ensure that the application will not be approved automatically according to the method and system of the invention. Finally, additional risk factors can easily be brought into the model.

For the example case, let it be assumed that the final LTVCap has been determined at 75%.

Step 66c: Determination of Primary LoanCap

As noted above, the primary LoanCap is calculated by multiplying the Property ValueCap by the LTVCap as shown in FIG. 3. In the step 66a of FIG. 3, the Property ValueCap of the example case is determined as $167,000. In the step 66b, the LTVCap of the example case is assumed to be 75%. Therefore, the primary LoanCap will be $125,250 ($167,000×75%).

Accordingly, the example loan application will be approved because the requested loan amount $125,000 is within the LoanCap $125,250, unless the following worst-case scenario is required to be considered.

Step 66d: Consideration of Worst-case Scenario

The AVM system provides a range of value for a collateral property. The method of the invention provides a significant extra level of safety by considering a worst-case scenario. In effect, the question is posed: "In the unlikely event of the default of this particular loan, and this property must be foreclosed on, what potential exposure does the lending institution have assuming a worst case, and is that acceptable?"

In most cases, there is little to no potential for net loss. However, in neighborhoods with high value ranges (such as real estate markets in transition), or with high market shifts, or with high LTV%, it is quite possible for the declared value to be substantiated and still have potential for loss. The method model provides management to limit the amount of potential downside risk to an level acceptable to them.

In the example case, the AVM has calculated a reasonable price range for a property as $130,000 to $171,000. The declared property value of $167,000 is within the value range, and thus can be substantiated. This step effectively asks the question: "If anything goes wrong, and we have a default on this property, what risk are we taking if the property was really only worth $130,000?" The method does this by estimating the potential for net loss, allowing for parameters supplied by risk. A final parameter allows risk to cap the amount of exposure to an acceptable level.

In this situation, the estimate of the costs associated with realization can be split into the following three separate components: 1. a cost based on the value of the property, 2. a cost based on the requested loan amount, and 3. a fixed cost.

In this worst-case scenario, the method assumes the AVM's Low Value Limit as a reasonable estimate of the value of the property which would be available on realization. In the example case, the realization costs can be estimated as:

1. A cost based on the property value: 6% of $130,000 (Low Value Limit) to cover real estate commission=$7,800;

2. A cost based on the requested loan amount: 1.045 of $125,000 to cover principle of the loan plus forgone interest=$130,625; and 3. A fixed cost: $2,000 to cover fixed costs such as legal and other expenses.

The total realization required would be estimated at $(130,625+7,800+2,000)=$140,425. Therefore, the potential net loss would be $(140,425−130,000)=$10,425, assuming that the property could only be sold for $130,000.

This may be acceptable, or it may not—it's a risk management decision to make. The method provides risk management a parameter that sets the limit to this net potential loss that is deemed acceptable.

Again, as an example, let it be assumed that risk management limits the potential net loss to $7,500. (In actual practice, this would be typical).

This decision would limit the loan amount that would be permitted on this property (the LoanCap) to be:

($130,000+$7,500−($130,000 * 6%)−$2,000)/
1.045=$122,200

Again, in most cases there is little to no potential for net loss. However, in neighborhoods with inconsistent sale values, or with high market shifts, there will be an inherent range of value for each property estimate due to the statistical results on the market data. This decision model provides management control to limit the amount of potential downside risk to an acceptable level.

Step 66e; Determination of Final LoanCap

The final LoanCap is the lesser of the following;

1. The Property ValueCap multiplied by the final LTVCap to set an primary LoanCap. In the sample case, this works out to ($167,000 * 75%)=$125,250;

2. The Worst Case LoanCap, determined by considering the worst case scenario, or $122,200; and 3. An Arbitrary LoanCap, which is set by risk management. This allows risk management control by saying, in effect, "We will not automatically approve any loan over $250,000 using an AVM system, regardless of how well the AVM system works, or how low the LTV ratio is to the property value".

Therefore, in the example case, the final LoanCap is $122,200.

Note that even though the declared property value is within the reasonable value limits that the AVM calculated for this property, the LoanCap will be reduced to mitigate against the uncertainly due to the range of value supplied by the AVM system.

The method and system of the invention have several advantages in a lending environment as follows;

1. AVM results are not used "raw", or subject to interpretation. Outlyer valuations that the AVM produces will be discarded. Any loans approved through the use of the AVM will have gone through a rigorous check, which has been pre-approved by risk.

2. The method offers risk management control based on AVM-supplied factors (such as market shift) in a manner that is not possible through traditional methods. Overall portfolio risk is lowered, by focusing expensive manual due diligence on those cases which are deemed to be higher risk.

3. The process lends itself to being implemented in a completely automated manner. However, it is also simple and fast to use and to integrate into existing manual processes, minimizing the potential for human error.

4. Because the process is so fast, approvals are instant, and the AVM tends to be the feast expensive option, all applications can be passed through this step before any other.

5. Risk management will specify its tolerance for risk using different control parameters which the method makes available, allowing risk management to control the process in a consistent, safe and flexible manner.

6. Management can change lending criteria "in the back", without affecting the ongoing process.

7. Because the method is automated, its results can be centrally monitored and controlled.

8. As the method is not AVM dependent, multiple AVM's can be implemented across various jurisdictions in essentially a consistent process.

While the invention has been described according to what are presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A method for processing a loan application on behalf of a lender by virtue of a computer system, where a real property is presented as collateral by the loan applicant, the method comprising steps of:
  (a) inputting the loan application into the computer system, the loan application containing the address of the real property;
  (b) providing the address of the property to an automated valuation model (AVM) system, for producing and returning valuation data for a real property in response to the provision of the address thereof;
  (c) receiving valuation data for the corresponding property from the AVM system;
  (d) determining a LoanCap for the corresponding property by applying a pre-determined lending policy to the valuation data and information provided in the loan application, the lending policy having been pre-set in the computer system, wherein the LoanCap comprises an amount determined by comparison of:
    (i) a loan-to-value assessment of the requested loan amount in the loan application, in light of a declared property value in the loan application, provided that the declared property value can be substantiated by the valuation data;
    (ii) a high value limit set by the lender; and
    (iii) an amount representing the lender's worst case scenario taking into consideration a minimum property value according to the valuation data and the lender's costs if the applicant defaults on the loan; and
  (e) comparing a requested loan amount in the loan application to the LoanCap, wherein, when the requested loan amount is within the LoanCap, the loan application can be approved, and (f) wherein, after the step (a), the steps (b) to (e) are carried out automatically and electronically in the computer system.

2. A method according to claim 1, wherein the address of the property is provided to a plurality of AVM systems, each of which returns independent valuation data for the corresponding property.

3. A method according to claim 1, wherein the LoanCap determining step (d)(i) includes steps of:
   (a) determining a property ValueCap by using the valuation data and the information provided in the loan application; and
   (b) determining a primary LoanCap by multiplying the property ValueCap by a pre-determined LTVCap (Loan-to-Value % Cap).

4. A method according to claim 3, wherein the property ValueCap is determined as the least value among (a) the declared property value provided in the loan application, (b) a high value limit of property included in the valuation data provided by the AVM system, and (c) a preset value which is determined according to the lending policy.

5. A method according to claim 4, wherein the preset value is determined depending on the geographic area of the property.

6. A method according to claim 3, wherein the pre-determined LTVCap is determined as a preset maximum limit which is determined depending on the lending policy and the information provided in the loan application.

7. A method according to claim 6, wherein the pre-determined LTVCap is determined as a conservative value through further consideration of each one or combinations of the following: (a) a transaction type provided in the loan application, (b) the geographic area of the property, (c) a neighborhood sales activity included in the valuation data, (d) a neighborhood historical high sales price included in the valuation data, (e) a market variance included in the valuation data, or (f) a difference between a declared property value provided in the loan application and property value included in the valuation data.

8. A method according to claim 3, wherein the LoanCap determining step (d) further includes a step of determining a secondary LoanCap as the least value among the primary LoanCap and the amount representing the lender's worst case scenario.

9. A method according to claim 8, wherein the secondary LoanCap is determined as the least value among the primary LoanCap, the amount representing the lender's worst case scenario, and high value limit.

10. A method for processing a loan application where a real estate property is presented as collateral by the loan applicant, the method comprising steps of:
    (a) checking whether or not all required credit and lending criteria, except for valuation of the property, are satisfied, wherein, if not satisfied, the loan application can be denied or returned to the applicant thereof, and wherein, if satisfied, the following step (b) is carried out;
    (b) carrying out the following method:
        (i) inputting the loan application into the computer system, the loan application containing the address of the real property;
        (ii) providing the address of the property to an automated valuation model (AVM) system, for producing and returning valuation data for a real property in response to the provision of the address thereof;
        (iii) receiving valuation data for the corresponding property from the AVM system;
        (iv) determining a LoanCap for the corresponding property by applying a pre-determined lending policy to the valuation data and information provided in the loan application, the lending policy having been pre-set in the computer system, wherein the LoanCap comprises an amount determined by comparison of:
            (1) a loan-to-value assessment of the requested loan amount in the loan application, in light of a declared property value in the loan application, provided that the declared property value can be substantiated by the valuation data;
            (2) a high value limit set by the lender; and
            (3) an amount representing the lender's worst case scenario taking into consideration a minimum property value according to the valuation data and the lender's costs if the applicant defaults on the loan; and
        (v) comparing a requested loan amount in the loan application to the LoanCap, wherein, when the requested loan amount is within the LoanCap, the loan application can be approved, and
        (vi) wherein, after the step (i), the steps (ii) to (v) are carried out automatically and electronically in the computer system.

11. A method according to claim 10, wherein the step (b) further comprises a step of scrutinizing the value of the property when the requested loan amount is not within the LoanCap to further determine whether the application can be approved.

12. A method according to claim 11, wherein a conventional appraisal of the property is used in scrutinizing the value of the property.

13. A computer system for processing a loan application on behalf of a lender, where a real property is presented as collateral by the loan applicant, the system comprising:
    (a) means for inputting the loan application into the system, the loan application containing the address of the real property;
    (b) means for providing the address of the property to an automated valuation model (AVM) system for producing and returning valuation data for a real property in response to the provision of the address thereof;
    (c) means for receiving valuation data for the corresponding property from the AVM system;
    (d) means for determining a LoanCap for the corresponding property by applying a pre-determined lending policy to the valuation data and information provided in the loan application, the lending policy having been pre-set in the system, wherein the LoanCap comprises an amount determined by comparison of:
        (i) a loan-to-value assessment of the requested loan amount in the loan application, in light of a declared property value in the loan application, provided that the declared property value can be substantiated by the valuation data;
        (ii) a high value limit set by the lender; and
        (iii) an amount representing the lender's worst case scenario taking into consideration a minimum property value according to the valuation data and the lender's costs if the applicant defaults on the loan; and
    (e) means for comparing a requested loan amount in the loan application to the LoanCap, wherein, when the requested loan amount is within the LoanCap, the loan application can be approved.

14. A system according to claim 13, wherein the address of the property is provided to a plurality of AVM systems, each of which returns independent valuation data for the corresponding property.

15. A system according to claim 13, wherein the LoanCap determining means includes:
   (a) means for determining a property ValueCap by using the valuation data and the information provided in the loan application; and
   (b) means for determining a primary LoanCap by multiplying the property ValueCap by a pre-determined LTVCap.

16. A system according to claim 15, wherein the property ValueCap is determined as the least value among (a) the declared property value provided in the loan application, (b) a high value limit of property included in the valuation data provided by the AVM system, and (c) a preset value which is determined according to the lending policy.

17. A system according to claim 16, wherein the preset value is determined depending on the geographic area of the property.

18. A system according to claim 15, wherein the pre-determined LTVCap is determined as a preset maximum limit which is determined depending on the lending policy and the information provided in the loan application.

19. A system according to claim 18, wherein the predetermined LTVCap is determined as a conservative value through further consideration of each one or combinations of the following: (a) a transaction type provided in the loan application, (b) the geographic area of the property, (c) a neighborhood sales activity included in the valuation data, (d) a neighborhood historical high sales price included in the valuation data, (e) a market variance included in the valuation data, or (f) a difference between a declared property value provided in the loan application and a property value included in the valuation data.

20. A system according to claim 15, wherein the LoanCap determining means (d) further includes means for determining a secondary LoanCap as the least value among the primary LoanCap and the amount representing the lender's worst case scenario.

21. The system according to claim 20, wherein the secondary LoanCap is determined as the least value among the primary LoanCap, the amount representing the lender's worst case scenario, and the high value limit.

* * * * *